Figure 1:
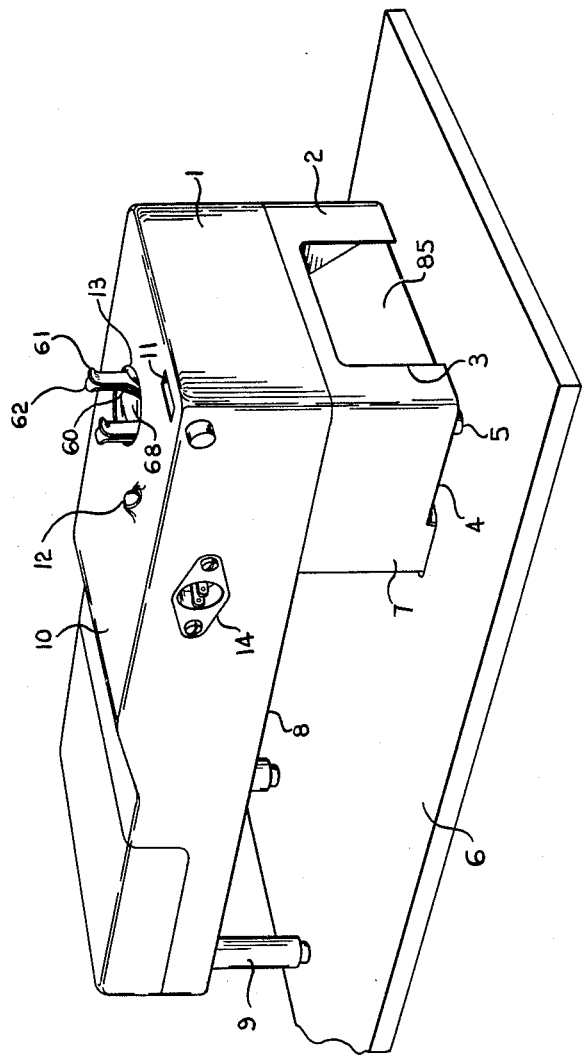

April 20, 1965   E. J BOLSEY ET AL   3,179,000
PHOTOGRAPHIC DATA RECORDER

Filed Nov. 20, 1961   7 Sheets-Sheet 1

INVENTORS
E.J. BOLSEY AND G.A. BUON
BY
ATTORNEY

April 20, 1965        E. J. BOLSEY ET AL        3,179,000
PHOTOGRAPHIC DATA RECORDER Filed Nov. 20, 1961        7 Sheets-Sheet 2

INVENTORS
E.J. BOLSEY AND G.A. BUON
BY
ATTORNEY

April 20, 1965  E. J BOLSEY ET AL  3,179,000
PHOTOGRAPHIC DATA RECORDER
Filed Nov. 20, 1961  7 Sheets-Sheet 4

INVENTORS
E.J. BOLSEY AND G.A. BUON
BY
ATTORNEY.

April 20, 1965  E. J BOLSEY ET AL  3,179,000
PHOTOGRAPHIC DATA RECORDER
Filed Nov. 20, 1961  7 Sheets-Sheet 5
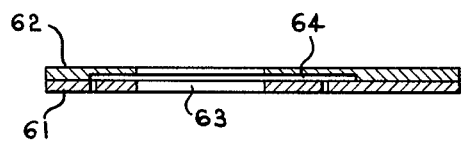
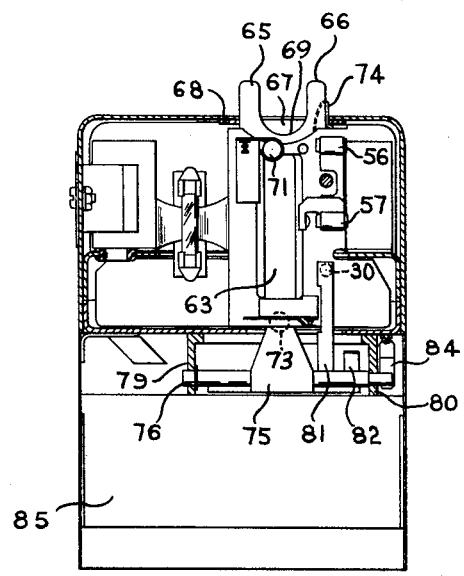
INVENTORS
E. J. BOLSEY AND G. A. BUON
BY
ATTORNEY April 20, 1965 E. J. BOLSEY ET AL 3,179,000
PHOTOGRAPHIC DATA RECORDER
Filed Nov. 20, 1961 7 Sheets-Sheet 6

INVENTORS
E.J. BOLSEY AND G.A. BUON
BY
ATTORNEY.

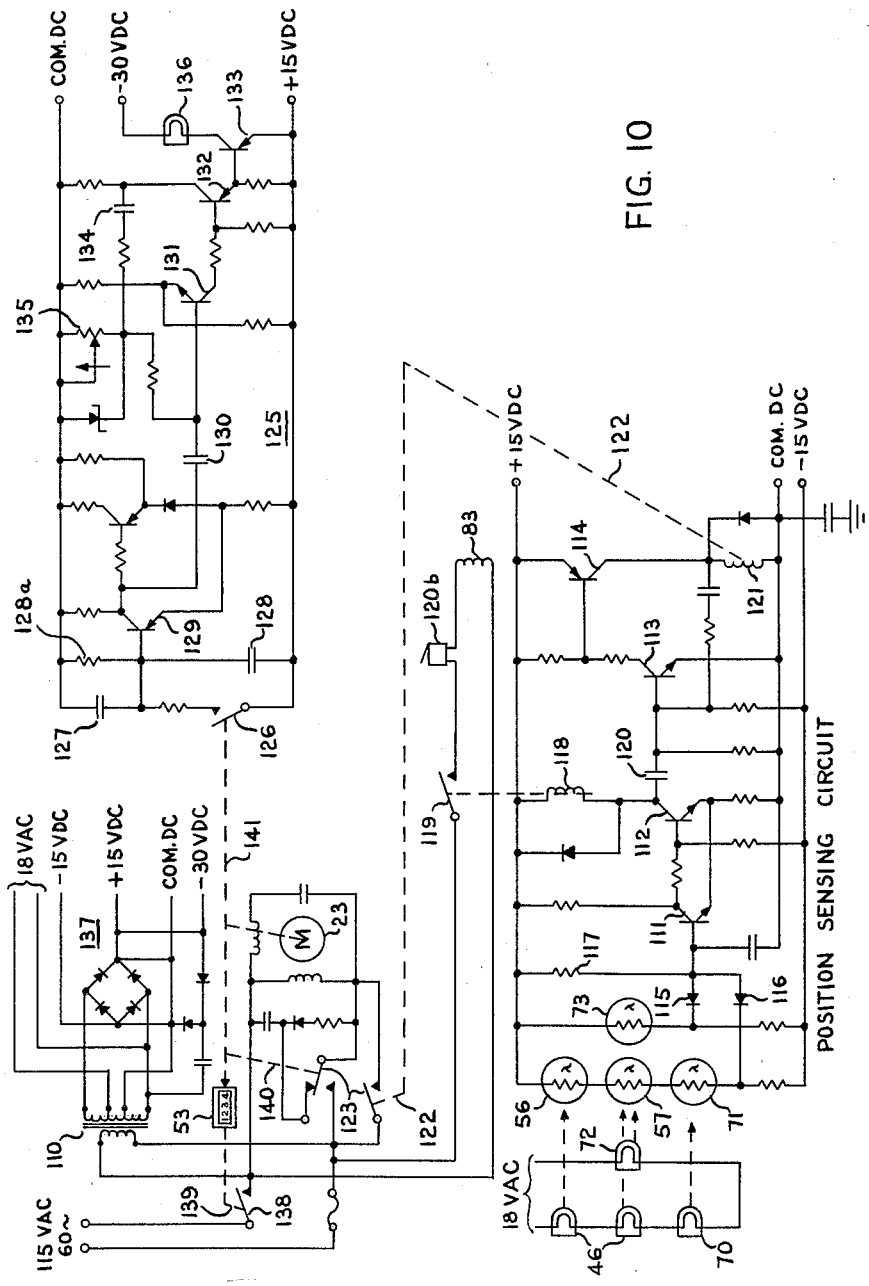

United States Patent Office 3,179,000
Patented Apr. 20, 1965

3,179,000
PHOTOGRAPHIC DATA RECORDER
Emil Jack Bolsey, White Plains, and Georges Andre Buon, Jamaica, N.Y., assignors to J. A. Maurer, Inc., Long Island City, N.Y., a corporation of New York
Filed Nov. 20, 1961, Ser. No. 155,234
11 Claims. (Cl. 88—24)

The instant invention relates to portable cameras particularly adapted to photograph on film data recorded or encoded on any medium, for example tickets or tags having encoded data thereon in the form of perforations and removed from items as they are sold, for example in retail stores.

Price tickets or tags generally are affixed to merchandise at some time prior to the latter being offered for sale, and have thereon information as to the kind of merchandise, its style, its size, its price, the identity of the retail store, and the like. As a piece of merchandise is sold, a portion of the ticket or tag bearing pertinent information is removed from the merchandise and forwarded to a control point in the store, or at the headquarters of a multi-store merchandising operation, etc., to assemble information as to what merchandise should be reordered for what store, etc. The pertinent information is generally printed or legibly marked on the original medium, for example the ticket or tag, but more recently such information is preferably encoded thereon, as by perforations through a predetermined portion of the tickets. Much of the required control has been, and is, performed manually, that is, the individual tickets are manually assorted and collected in groups of the same or like merchandise, and thereupon the data is manually encoded on cards for use with computers. Even so, the time effectively to read out, say a thousand of such sales transactions of which the tickets are coded, for purposes of reordering, inventory, etc., is very substantial.

The method and apparatus of our invention of recording coded information from a succession of individual records, originally separately made, onto a continuous strip of film, speed up such control to a most remarkable extent. We herein illustrate both in respect of the above mentioned tickets or tags which are removed from items at the time of their sale, but it is to be understood that neither the method nor the apparatus is to be limited to such illustrative embodiment. The removed ticket portions are collected, and when a sufficient number of them have been accumulated, are individually photographed on a reel of film in the random order in which they are in the collection or accumulation.

We provide a special construction of camera to photograph the encoded information, the camera being so constructed that the ticket must be inserted into the exposure light path of the camera in the correct position before an exposure will automatically be made. The tickets are manually fed one at a time into a fixed insertion slot. Only if the individual ticket is correctly positioned therein, as determined by an electrical check circuit, is the recording light flashed, the flash of the recording light being visible externally of the camera by the person feeding the tickets into the camera. The check circuit, shown as a photoelectric circuit in the illustrative embodiment below discussed in detail may be of any appropriate type, and gives a signal, preferably audible, until a ticket and but a single ticket, is fully and correctly inserted in the camera. Just as soon as the correctly inserted ticket is fully in the slot, a cycle of operations is automatically initiated and carried to completion by the check circuit, during which cycle the photograph is made and the entire mechanism with its electrical circuits, as also the film, is readied for the next ticket to be inserted, the audible signal ceasing until the next ticket is being inserted.

During the cycle, a card selector positioned at the exit end of the ticket slot, is so conditioned that if a photograph was taken, the ticket photographed will be deflected into one chute, the "accept" chute, on its displacement by the next ticket to be inserted, or into a different chute, the "reject" chute, if no photograph was taken, that is, if the ticket in the recorder camera was incorrectly positioned. The insertion of the next ticket, whether this ticket is being inserted correctly or incorrectly, displaces the preceding ticket into the accept or reject chute as the case may be, and the audible signal is actuated for the interval from the beginning of the insertion of the next ticket until such ticket is fully inserted, the signal stopping if the ticket is correctly inserted but continuing to sound if such ticket is incorrectly inserted. If the next ticket has been incorrectly inserted, the audible signal continuing calls the operator's attention to such fact and puts him on notice to take care to insert a subsequent ticket correctly, the insertion of each subsequent ticket displacing the immediately preceding ticket into the reject chute. The accept chute, into which photographed tickets are ejected successively, preferably directs these tickets into a sealed container of any convenient size, whereas the reject chute opens to the front of the camera and is provided with an opening in the front wall of the camera large enough for the operator to insert his hand to remove the non-photographed ticket for refeeding it into the camera in correct position. Passage of a ticket through the reject chute in no way impairs the record encoded thereon.

The photographs are taken on a continuous reel of film, for example a standard packaged 50-foot reel of 16 mm. film with double 8 mm. standard sprocket perforations, with the photographs equally spaced and extending across the width of the film field. Thus, with this size film, about seven tickets per inch can be recorded, giving somewhat over six thousand for this length of film. In the illustrative embodiment of our camera hereinafter described, not only is the encoded information of the tickets recorded on the film, but each photographic record of the code on the ticket is supplemented by the photograph of an additional row of perforations to identify, for example, the camera by which recorded, and an additional column thereof to synchronize subsequent reading operations, the additional column and the additional row of perforations being disposed in elements of the camera and likewise appearing as black dots in the developed negative.

An object of the invention is to provide a film record of a plurality of individually encoded information of any character, for example, of commercial transactions, which are encoded in the form of dots and in form of spaced records on a continuous film and can readily be transferred to encoded individual cards for use with computers.

Still a further object of the invention is to provide means by which the permanent record on film of individual information can be made only in accurate and correct form, the individual information records which are presented incorrectly for permanent recording on the film being rejected.

Still a further object of the invention is to provide a photographic recorder in which once an individual record or ticket has been fully inserted it cannot be manually removed without inserting another ticket whereby all photographically recorded items are accurate and correct, there being substantially no posibility of error in converting the individual original record to the film.

Still a further object of our invention is to reduce the size and weight of the medium carrying record information for further processing and control, as also to eliminate both the need for stacking and spindling individual original records and the chance of loss or oversight of such records in the processing of the data therein given.

Figure 2:
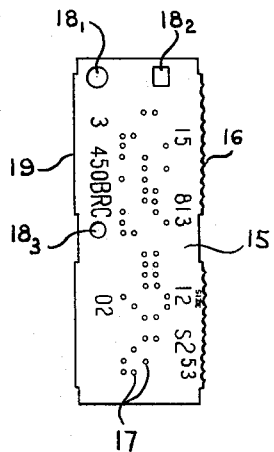
Figure 3:
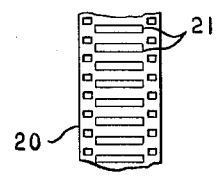
Figure 7:
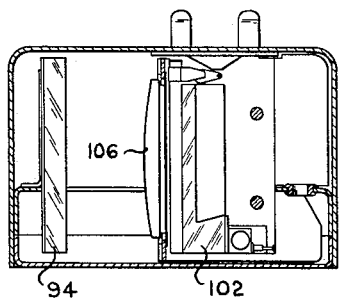
Figure 4:
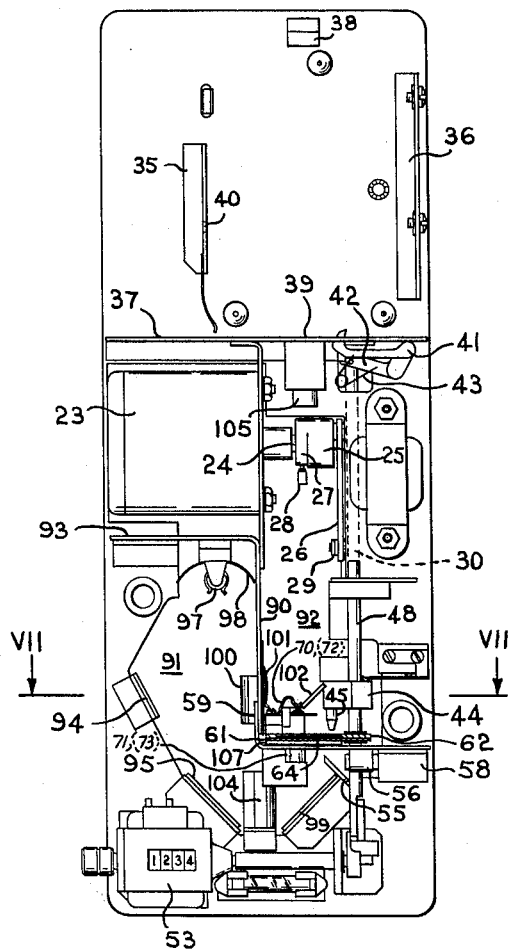
Figure 5:
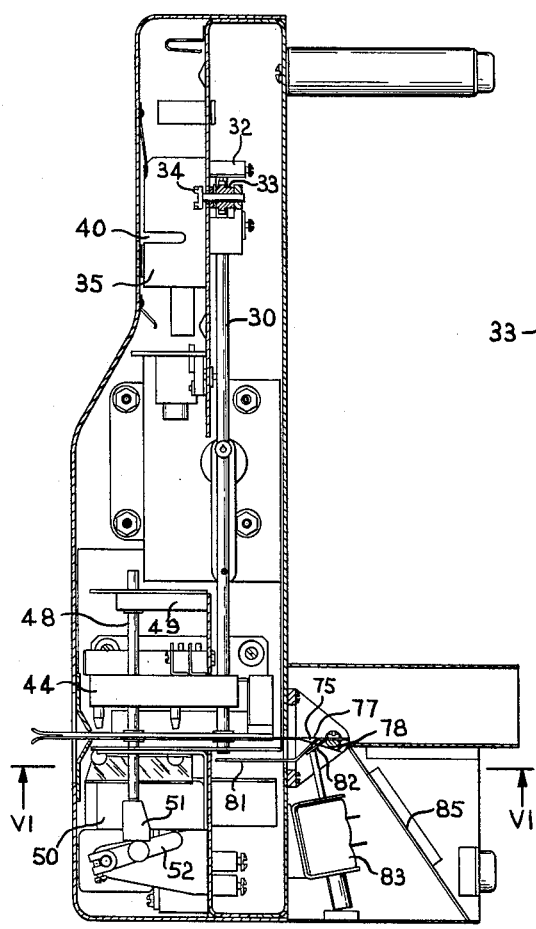
Figure 5A:
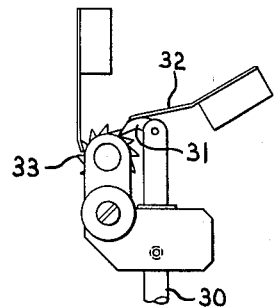
Figure 5B:
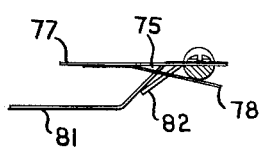
Figure 8:
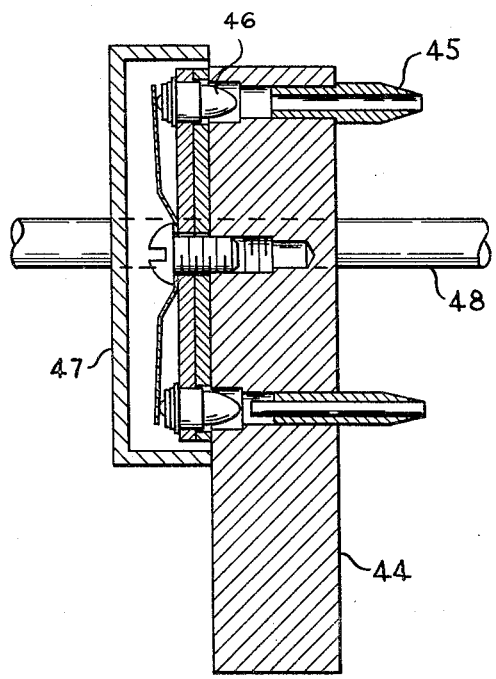

The foregoing, and other, objects and features of our invention will more readily be understood from the following detailed description of an illustrative embodiment thereof when read in conjunction with the annexed drawing, in which:

FIG. 1 is a perspective view of the illustrative embodiment of the photographic data recorder or camera in use;

FIG. 2 an illustrative embodiment of one type of prior known encoded transaction ticket or tag for use with our data recorder or camera;

FIG. 3 is a section of film carrying photographs made with the data recording camera of our invention;

FIG. 4 a plan view of our data camera or recorder with the cover of the camera removed and the film magazine removed;

FIG. 5 a side view of our camera with the side wall removed;

FIG. 5A an enlarged detail of FIG. 5, specifically the film advancing claw region of the actuating shaft;

FIG. 5B another enlarged detail of FIG. 5, specifically the card selector;

FIG. 6 a section on line VI—VI of FIG. 5;

FIG. 7 a section on line VII—VII of FIG. 4;

FIG. 8 an elevational longitudinal section of the sensing pin block;

FIG. 9 a transverse section, considerably enlarged relative to the other figures, through the ticket slot forming plates at the data exposure aperture thereof; and FIG. 10 a schematic of the electrical circuit of our data recorder.

Referring to FIG. 1, the bottom casing 1 is open at two regions thereof to permit access to the data cards or tickets which have passed through the recorder. The front face 2 thereof defines aperture 3 through which data cards, which have in any way been incorrectly inserted into the recorder may be retrieved, while the forward portion 4 of the bottom face thereof is spaced, by a pair of front legs 5, at a distance from the surface 6, for example a desk or table top, upon which the camera is placed. The chute 7, immediately behind forward portion 4, extends downwardly a distance beyond such forward portion, preferably extending into a corresponding aperture through surface 6, thus effectively guiding the ejected cards which have been recorded, into a convenient receptacle as explained below. The elongated mounting plate 8, which serves as the mounting plate for individual elements of the camera, extends rearwardly beyond bottom casing 1 and is supported at its rear on surface 6 by a pair of legs 9. The upper casing is provided with a number of apertures, 11, 12 and 13, of which 11 and 12 have transparent glass covers through which a counter may be read, respectively, the light flash when the data is recorded, observed. A socket 14 is likewise provided for connecting the line supply.

The data card 15 of FIG. 2 illustrates the prior known type of card of which the coded information is recordable by the illustrative embodiment of our camera to be described in detail below. Data card 15 is actually a portion of a price ticket of which a portion, not here shown, is attached to any item of commerce, for example a garment, data card 15 being severable therefrom by tearing along perforated longitudinal edge 16, for example. Data card 15 has a series of small pin holes 17 perforated therethrough in a prearranged code identifying the item to which it was attached together with one or more characteristics thereof, as for example, size, style, color, price, retail store in which sold, etc. The data card, in addition, may have printed thereon the data encoded by the pin holes but such printing is not necessary for the purposes of our camera. In addition, each data card 15 to be used in a given type camera according to our invention, is provided with identical correct-position perforations 18. Thus in the illustrative card shown, the correct-position perforations are three in number, namely, relatively large circular aperture $18_1$, square aperture $18_2$, and circular aperture $18_3$, which are positioned at identical regions of each card in addition to being the same size for all data cards. The exact mode of utilizing these correct-positioning apertures, as also the straight longitudinal edge 19 of the data cards, is described below.

At this time, suffice it to say that in the camera of the instant invention, the individual data cards, on manual insertion in correct position into the camera light path, are photographed on film, for example 16 mm. film, light passing through the coded pin hole perforations 17 which appear on the developed negative as black dots. The data cards, when correctly positioned, are photographed so that the coding appears transversely across the frames of the film 20, as shown in FIG. 3 and are spaced longitudinally on the film a distance from each other about equal to the longitudial extent of the coded record 21 on the film. In 16 mm. film thus, there are some seven data cards recordable per inch or one per frame and for a 75 foot reel, the maximum number of tickets recordable is some 6000 plus or minus.

Referring now to FIG. 4, showing the top plan view of the embodiment of our camera, the upper face of elongated base 8 supports, either directly or on a formed chassis 22 spaced therefrom, various structural elements of the camera, including the optical system, the film drive mechanism, the flasher elements, the coded or data card insertion means, etc. A driving motor 23, mounted directly on base 8 at an intermediate lateral portion thereof, has rotor shaft 24 provided with an eccentric 25 for reciprocating rod or arm 26 coupled thereto. Rotor shaft 24 has a peripheral cam 27 integral therewith, the movable contact of a normally open electrical microswitch cooperating as a follower therewith, as below discussed in connection with the cyclic operation of our camera. By way of pivotal coupling 29, arm 26 is connected to actuating shaft 30 to move the latter axially of itself in either direction. The rear portion of shaft 30 carries a pawl 31, of which the forward end is pressed by leaf spring 32 into engagement with ratchet 33 rigid on the rotatable shaft of driving coupler 34.

A standard magazine of the above type of 16 mm. film, when mounted correctly on the film magazine portion of chassis 22, between the two lateral brackets 35 and 36 and the magazine front bracket 37 and magazine rear spring 38, has its film gate registering with optical system aperture 39 in bracket 37. The normally sliding cover of the film gate is thereby removed from the reel gate in that the externally extending pin on such slidable cover, is manually moved until such pin can freely enter vertical slot 40 in lateral bracket 35. On such correct loading of the film magazine, a biased pull-down claw 41 extends through an aperture in the film casing and engages a sprocket hole of the film. Claw 41 is movable in the pull-down direction of the film by an angle lever 42 pivoted on chassis 22, the claw being pivotally supported on one arm of such angle lever of which the other arm is coupled to actuating shaft 30. Biasing spring 43 between claw 41 and the arm of angle lever 42 coupled to shaft 30, biases claw 41 in the direction to enter the sprocket holes of the film in the casing. It will be noted that simultaneously with the movement of the claw 41 in the pull down direction by the rearward movement of actuating shaft 30, pawl 31 actuates ratchet 33, rotating coupler 34, which is coupled with a drive wheel of the film magazine, and advances the film to the next unexposed frame.

Coupled to shaft 30 for reciprocatory movement therewith, a block 44 carries a plurality of hollow pins 45 for checking the correctness of the position of the data card 15 at the time inserted in the slot of the camera. The external forward ends of hollow pins 44 are tapered to facilitate their entering the corresponding correct-positioning perforations $18_2$ and $18_3$ in the data tickets when the latter are correctly positioned in the camera. At the other end of each hollow pin 45, a miniature electric lamp 46 is supported in the block 44 in alignment with, and extending into, the bore of the respective pin 45, so that all the light from each lamp 46 passes through the bore of the hollow pin associated with the lamp. To prevent leakage of light from miniature lamps 46 while at the same time permitting access thereto for replacement thereof, a cover 47 is fitted to the lamp side of block 44. A guide shaft 48, slidingly supported in a first bearing bracket 49 affixed to chassis 22 at a region thereof longitudinally between motor 23 and block 44, extends snugly through and is keyed to an upper region of the block. At its forward end region, guide shaft 48 is slidingly supported in a second bearing bracket 50 and is provided with a finger 51 which actuates a tap 52 of an exposure counter 53.

Attached to chassis 22 by a vertical bracket 59, positioned longitudinally in front of block 44 carrying hollow pins 45 and miniature lamps 46, slot 60 is formed between two elongated formed plates 61 and 62 each defining a vertically elongated aperture 63 therethrough. Each aperture 63 is substantially rectangular with its longest sides vertical and its dimensions such that the maximum field, which can be coded on data cards for which the camera is intended, will be exposed when a data card is correctly positioned relative thereto and light caused to strike the card so positioned. The front surface of the rear plate 62 of the pair has a groove 64 extending its length of a thickness and width to receive the data cards one at a time, with the rows and columns of the encoded information of the data cards being wholly within mutually registering apertures 63. At the top end region of plates 61 and 62 as installed in the recorder, the central portion is cut away to a width and depth that the average adult thumb and index finger can readily insert a data card into groove 64, that is, between spaced portions 65 and 66 of the pair of plates. The portion cut away is also of such magnitude that with the upper edge of the inserted card flush with the lowermost point 67 of the resulting recess between projecting portions 65 and 66, registering apertures 63 completely uncover the coding field of the data tickets. In assembling the camera, a finger guide or stop 68 of, for example sheet aluminum, and having a central substantially hemispherical depression 69, is so mounted on the recorder casing that its lowermost portion, as installed, coincides with that of recess 67 of plates 61 and 62. Each of projecting portions 65 and 66 is flared outwardly at its top for facile starting of the data cards in groove 64.

Also supported on vertical bracket 59, but on the rear face thereof, a miniature lamp 70 is supported in a light-tight tube by which all light from such lamp is directed toward another correct-positoning perforation $18_1$ of the data card completely and correctly inserted in the camera recorder. On the front face of bracket 59, that is, on formed plate 61, a photoelectric cell 71 is mounted in alignment with lamp 70. At the bottom of rear plate 62, and substantially aligned vertically with lamp 70, another lamp 72, similarly in a light-tight tube, passes all its light to an individual photoelectric cell 73, for a purpose as will hereinafter be described. Plates 61 and 62 are so supported by vertical bracket 59 that when a data card is fully inserted between the plates in groove 64, vertically guided by a pair of springs 74, one at each side of the groove at the top region of the plates—the insertion being completed when the fingers of the person inserting the data card strike finger guide depression 69— the lower edge of the inserted data card is just above the control flap 75 of the card selector assembly, leaving an open space so that light from lamp 72 may unimpededly fall upon the associated photoelectric cell 73.

The card selector assembly comprises a shaft 76 supported transversely of the data recorder by a bracket 79 depending from the top of the selector casing 80 which in turn is attached to the lower face of chassis 22, the control flap 75 extending radially upwardly from shaft 76 through a wide slit in bracket 79. Flap 75, positioned in alignment with the path of data tickets ejected from groove 64, consists of two thin, relatively elastic blades, 77 and 78, of metal joined along one edge to form a V, the free end region of blade 77 being attached to a flattened portion of shaft 76 so that the free end region of the other blade 78 extends freely over the shaft portion diametrically opposite such flattened portion. Also fixed on shaft 76, and extending vertically upward when shaft 76 is in its normal position, is an elongated radial member 81 of which the free end is engageable by the front end of actuating shaft 30 when the latter has moved completely forward on initiation of a cycle of operations when a card has been correctly and completely positioned in slot 60, rotating shaft 76 forwardly. A mechanical flip-flop, in the form of an overcenter or toggle spring 84, has its upper end anchored in chassis 22 and its lower end in shaft 76 in such manner that spring 84 is convex to the front when radial member 81 has been pushed by actuating shaft 30. However, flap 75 is so positioned that on insertion of the next card into slot 60, the card presently within slot 60 is directed into the accept chute 7 absent a pulse in solenoid 83 which has pushed switch finger 82 rearwardly to snap spring 84 into its position concave to the front. With spring 84 in its forwardly concave position, flap 75 would be so positioned that its free end is to the rear of insert slot 60 and thus direct the data card being ejected from such slot against inclined wall 85 of the reject chute opening into front aperture 3 of the data camera.

Turning now to the optical and light system of our data recording camera, a vertical partition 90 extends longitudinally the casing interior forming therein two elongated regions 91 and 92. Interior region 91 extends from a vertical partition 93, transverse to partition 90 and adjacent to motor 23, longitudinally forward and includes two reflecting mirrors 94 and 95 positioned opposite partition 90. Interior regions 91 and 92 are open to each other at the forward ends thereof, and are sealed against outside light in that partitions 90 and 93, as also film magazine front bracket 37 and partition 96, connecting partition 90 to front bracket 37, extend from chassis 22 to camera cover 10, so that with the camera cover in position no light external to the camera can penetrate thereinto. It will be noted that motor shaft 24 extends through partition 96. Supported on partition 93, in the region thereof adjacent to partition 90, a flash lamp 97 is provided with a reflector 98 for throwing light from lamp 97, when illuminated, substantially forward longitudinally. Lamp 97 has an elongated filament to give an extended light source and is provided with light diffusion means, not shown, such as a field or condenser lens. In addition, or in the alternative, to the lens type of diffusion means at the lamp, the interior walls of elongated chamber 91, to the front thereof where the light passes into elongated chamber 92, may all be of light-diffusing reflecting material. Mirror 95 is positioned at 45° in and centrally of the longitudinal beam path from lamp 97, which is parallel to partition 90, and reflects the light incident thereon into the reflecting mirror 99 in elongated region 92. In the forward region of partition 90 a core carrier 100, comprising a condenser lens 106, and a rectangular sheet of light transmitting plate glass with a code plate 101 in the form of an image-L extending along one vertical edge region and the bottom edge region of the plate glass, is in the path of that portion of the light from lamp 97 which is reflected from mirror 94 into the elongated interior region 92. The code plate 101 is of opaque material, such as aluminum, and the code thereon is in the form of perforations in both arms of the image-L, that is, arranged in a column and a row.

The forward end of partition 90 is attached to bracket 59 supporting the pair of slot forming plates 61 and 62 as also a condenser lens 107 extending across the apertures 63 in front, in the direction of the photographing light, thereof, and an image-L shaped mirror 102 is positioned in the path of the light beam reflected from mirror 94 and transmitted through Fresnel lens 106, code carrier 100 and code plate 101, the reflecting surface of mirror 102 being so positioned that this beam is reflected from mirror 102 parallel to partition 90. Positioned in the front end of interior region 92 beyond the end of partition 90, mirror 99 receives the light reflected by mirror 95 through a rectangular plano-convex lens 104, with both mirror 99 and lens 104 being centrally aligned in the beam path from mirror 95. As has been stated, plates 61 and 62, forming data card receiving slot 60 between them, define central mutually registering apertures 63 of rectangular shape and of dimensions equal to the corresponding dimensions of the maximum area of the data cards which might be coded. At this point it is to be noted that the dimensions of mirrors 95, 94 and 99, as also the height of the vertical arm and the width of the leg of the image-L shaped mirror 102, exceed the corresponding dimensions of insert slot apertures 63. Mirror 99 is centralized and aligned with apertures 63 through the slot plates, the latter in turn being aligned with each other and aligned and centralized with photographic objective 105 and exposure aperture 39 in bracket 37. In addition, image-L shaped mirror 102 is mounted in such position relative to slot apertures 63 that the row code reflected by the leg portion of such mirror lies directly below the lower edge of apertures 63 and, in the direction facing the reflecting surface of mirror 102, the columnar code reflected by the vertical portion of the mirror lies directly adjacent to the right edge of such apertures. Thus, when lamp 97 is flashed, one portion of the beam therefrom is reflected in such direction that light passes through Fresnel lens 107 and only the code perforations 17 in the data card correctly positioned between plates 61 and 62 and into objective 105, while another portion of the beam from lamp 97 is reflected by mirror 94 through the code carrier 100, the perforations of code plate 101, and lens 106, such beam being then reflected by mirror 102 into photographic objective 105, the latter reflected beam being closely adjacent to and parallel with the light passed by code perforations 17 of the inserted data ticket, thus effectively producing a single record of both codes without interference between the codes respectively on data card 15 and code plate 101.

The front face of bracket 59 has a lateral projection 58 extending forwardly therefrom at a region thereof laterally of apertures 63. A pair of photoelectric cells 56 and 57 are mounted on projection 58 and, by way of elongated mirror 55, receive light from the two lamps 46, respectively. Mirror 55 is positioned at 45° to the longitudinal axis of positioning pins 45 and is preferably supported, with mirror 99, on bracket 59. As will readily be noted, mirror 55 is sufficiently to the side as not to interfere with the beam reflected from mirror 99 to the coding field of the correctly inserted data ticket in slot 60.

Referring now to the electrical components, their interconnection is shown in the schematic of FIG. 10. Most of them are mounted in our camera on an insulating board, mounting plate 8, or chassis 22, at convenient points so as to minimize the volume occupied thereby. Actual spatial mounting positions and locations of most of the electrical components are not shown in the drawing but will be readily apparent from the circuit schematic of FIG. 10.

Current for the two position sensing lamps 46 of movable block 44, as also for the fixed position sensing lamps 70 and 72, is supplied from the secondary of line transformer 110. Photocells 56, 57 and 71, associated with data ticket positioning-apertures $18_1$, $18_2$ and $18_3$, respectively, are series connected to each other and connected in a logical AND gate configuration with photocell 73, associated with position sensing lamp 72 which senses whether there is an obstruction in the light path from such lamp to such photoelectric cell. As follows from the position sensing circuit portion of the schematic of FIG. 10, when there is no light on any of the photoelectric cells, trigger circuit 111 is cut off. With light on series connected photocells 56, 57 and 71 but no light on PEC 73, the base voltage of transistor 113, is cut off; and, similarly, with light on PEC 73 and none on PEC's 56, 57 and 71, nothing is changed and Schmitt trigger circuit 112 remains actuated and thus relay 118 is energized. The contact switch associated with relay 118 is closed, and solenoid 83 is energized, as is buzzer 120B in shunt thereof, the latter giving the audible signal indicating the inserted data ticket is not yet completely in slot 60 and, if continuing when the data ticket is completely inserted, that the latter is incorrectly in slot 60.

When, however, all four PEC's are receiving light from their associated lamps, both diodes 115 and 116 are cut off from the input of transistor 111, current now being fed thereinto through resistor 117. Transistor 112 turns off and the transient step generated thereby is differentiated by capacitor 120 and is applied as a differentiated pulse to monostable multivibrators 113 and 114 and associated elements, and transistor 114 produces a pulse of 0.1 or 0.2 second duration which energizes relay 121. Relay 121 controls motor circuit contact 122 and on energization closes such contact 122 which reopens after about 0.1 to 0.2 second (the duration of such pulse). However, rotating shaft 24 of motor 23 bridges contact 122 by way of cam 27 and microswitch follower 28, so that when switch 122 opens after the stated interval, the line circuit through the motor remains closed by way of closed microswitch 123 and motor rotation continues until the motor shaft has completed somewhat less than a single complete revolution. The rotation of motor shaft 24 is stopped at precisely the correct point by dynamic brake 124 of known type across the motor field circuit.

The flasher circuit 125 is a transistorized Schmitt circuit and is mechanically controlled by normally closed switch 126, the circuit being such that on opening switch 126, at the start of the cycle when motor shaft 24 commences rotation, capacitor 127 discharges while capacitor 128 charges through resistor 128, the rise at capacitor 128 turning on transistor 129. The resulting positive pulse at the collector of transistor 129 is differentiated by capacitor 130 and applied to the base of transistor 131, turning it on. Transistors 132 and 133 now conduct and initiate a cycle in time determined by capacitor 134 and all the resistors, particularly variable resistor 135, of a duration that high peak brilliance is obtained in light bulb 136 by an overvoltage, of some 45 to 50 volts, applied to such 12-volt bulb. Thus, the total illumination produced is highly actinic and substantially independent of variations in line voltage.

In addition to the position sensing and flasher portions, the electrical circuit includes a power supply portion 137, which may be of any usual prior known type and hence is not further described, as also a switch 138 in the line supply circuit. As indicated by dashed line 139 in FIG. 10, the exposure counter 53, itself mechanically coupled to rotor shaft 24 of motor 23, is coupled to switch 138 to open the latter when the count of the exposures made reaches 6,000, for example. Similarly microswitch 123 as indicated by dashed line 140, is coupled to motor shaft 24 so as to open microswitch 123 after substantially a single rotation of the motor shaft as above stated, and switch 126, as indicated by dashed line 141, is so coupled to such shaft as to close switch 126 after such single rotation.

Summarizing the operation of the apparatus of the illustrative embodiment, after the line supply is connected to socket 14, a data ticket 15 is inserted into slot 60. Whether the data ticket being pushed into the slot is being inserted correctly or incorrectly, in so far as the position sensing apertures 18 of the ticket, and the position sensing lamps, 46, 70 and 72 of the camera are concerned, the prior ticket is immediately being pushed past the lower position sensing lamp 72, thus preventing light from lamp 72 from reaching its associated photoelectric cell 73. Hence relay 118 is energized to close its associated contact switch and solenoid 83 and buzzer 120 are energized. While the movable core of solenoid 83 thus pushes against switch finger 82 to rotate shaft 76 with flap 75 so that the free end of the flap tends to rotate to a position behind the prior inserted ticket now being ejected, flap 75 cannot fully do so at this time since the lower edge of the ticket being ejected from the lower end of slot 60 is already behind the free V-edge of flap 75. Completion of the rearward movement of the flap is thus prevented at this time until the data ticket being ejected completely leaves slot 60, at which time as the result of the resiliency of its blades, 77 and 78, flap 75 completes its rearward movement. It will be noted that the light path from lamp 72 to photoelectric cell 73 is immediately upon starting to insert a data ticket intercepted by the prior card being ejected. This condition continues, that is, the buzzer sounds, until the upper edge of the ticket being ejected unblocks such light path. Just as soon as the top of the ticket under ejection clears the lower edge of slot 60, such ticket freely drops through the accept or recorded chute 7. At the same time spring 84 snapping into its rest position with its curvature concave to the front, into which it has been pushed partially by the core of solenoid pressing on switch finger 82, completes the rotation of shaft 76 to position the free V-end of flap 75 behind slot 60 and the data card inserted therein.

As stated, the ticket, which has now been inserted completely, that is, with the top of the ticket flush with the lowermost depression 69 of the finger guide 69, may be in the slot 60 correctly or incorrectly. If correctly, the position sensing perforations register with the corresponding position sensing lamps and the light path from lamp 72 to its associated photoelectric cell 73 is unblocked. At this moment, relay 118 is deenergized, switch 119 restores to its biased open position, and the solenoid 83 and the buzzer 120 are deenergized. At the same time, relay 121 is energized and closes motor switch 122, starting the rotation of motor shaft 24 as above stated, which rotation is maintained for substantially one turn of rotor 24 by cam 27 closing the microswitch controlled by follower 28. In the meantime, actuating shaft 30 moves forwardly, positioning pins 45 on block 44 enter corresponding apertures in bracket 59, and on completion of its forward movement, the actuating shaft 30 pushes elongated member 81 on the card selector shaft 76 forward, such movement causing the spring 84 to snap into its convex forward position which spring 84 maintains. The forward motion of actuating shaft 30 also moves guide shaft 48 forward so that its finger 51 rotates the tab 52 so that one more exposure is added to the total on exposure counter 53. At this time also, the flasher circuit switch 126 is opened and after a slight time delay, lamp 97 is flashed to make the recording, as above stated. That the camera is actually operating and the inserted ticket has in fact been photographed, is readily observable by the operator by watching flash aperture 12, which preferably has a colored glass, for example red, therein, light up as the exposure is made. On the return stroke of the actuating shaft 30 while the motor shaft 24 continues on the second half of its single rotation, claw 31 on the rear portion of the actuating shaft actuates ratchet 33 to rotate ratchet coupler 34 to position the next unexposed film frame behind the optical aperture 39. This completes the cycle initiated by a correctly and fully inserted data ticket.

Now assume that the data ticket completely inserted has been inserted incorrectly, that is, position sensing apertures do not register with lamps 46 and 70. It will be recalled that when the prior inserted ticket has been ejected, spring 84 has snapped into its concave forward position and the free V-end of the flap 75 has been positioned behind slot 60. Now with the incorrectly inserted data ticket there being no registration of the data ticket perforations 18 with the light paths to PEC's 56, 57 and 71, that is, these three light paths are blocked, all three of these photoelectric cells remain unilluminated, and relay 121 of the position sensing portion of the circuit remains unenergized and the motor cycle is not initiated. Switch 119 remaining closed, both the solenoid 83 and the buzzer 120 remain energized, that is, the buzzer remains audible and the movable core of solenoid 83 continues to press against switch finger 82, and spring 84 remains in its concave forward position. The buzzer continuing to sound, and no exposure flash being observable by way of aperture 12, the operator of the data recorder is thus put on notice that he should be careful to insert the tickets in correct position. As he now inserts a data ticket, the V-end of the flap 75 being behind slot 60, the ticket being ejected will be guided by blade 77 of the flap into the reject chute and slide forwardlly on inclined wall 85 and through aperture 3 in the camera front wall 2. The operator will promptly know when he has inserted a data, ticket completely and correctly by the buzzer stopping to sound. When the now inserted data ticket is correctly and fully in slot 60, the cycle of operations above described is immediately and automatically performed.

As has been stated, we do not limit ourselves to the embodiment of our invention above described by way of illustration, limiting ourselves only as may be required by the prior art. Various modifications will presumably suggest themselves to workers in the art which fall within the spirit and scope of our instant inventions. Thus by way of one example of a modification, instead of flashing a lamp to make an exposure, daylight or a lamp continuously illuminated behind a normally closed shutter may be used by opening the shutter at the definite point at which all is prepared and checked to make the exposure.

What we claim is:

1. A camera for recording the information encoded by perforations on individual carriers comprising at least one elongated light tight chamber, a photographic objective at one end region of the elongated chamber, an open film gate associated with the photographic objective, photographic film in the gate, a perforated code member in the elongated chamber and spaced from the region of the objective, film gate and film, means for introducing a perforated carrier into elongated chamber in predetermined relation to the perforated code member, sensing means for checking the correctness of the predetermined relation between the introduced carrier and the code member, a photographic recording lamp, means for advancing the film, and electrical circuit means for connecting the sensing means, the lamp and the film advancing means to a source of electrical potential in such manner that on insertion of a perforated carrier into the introducing means the sensing means is actuated, and only on verification thereby of the correctness of the predetermined relation is the lamp energized for passing light simultaneously through the perforations of the carrier and the code member to photograph the perforations of both on the film and thereupon extinguished and the film advancing means immediately actuated to advance the film in an amount just sufficient for the photograph of such perforations when the next carrier is correctly inserted in the introducing means.

2. The camera according to claim 1 in which the sensing means actuate a selector means directing the ejection of the perforated carrier from within the chamber to one of an accept chute and a reject chute dependent on the verification, respectively the lack of verification, of the correctness of the predetermined relation for the particular carrier inserted into the elongated chamber.

3. The camera according to claim 1 having an audible signalling means and a light signal window in an exterior wall of the chamber in which the sensing means having verified the predetermined relation for the particular perforated carrier inserted, the subsequent energization of the lamp illuminates the light signal window, while on failure of such verification of the predetermined relation the sensing means actuates the audible signalling means, the lamp being energized but for the interval to make an exposure of the film in the gate while the audible signalling means remains actuated until a subsequent perforated carrier is inserted into the chamber and the predetermined relation is verified for the subsequent carrier.

4. The camera according to claim 1 in which the circuit means after verification of the predetermined relation by the sensing means actuates the selector means so as to position it to permit ejection of the photographed carrier only by way of the accept chute, while on a failure to verify the correctness of the predetermined relation by the sensing means the selector means is so actuated as to permit ejection of the nonphotographed carrier only by way of the reject chute, actual ejection of the carrier in both cases occurring on the insertion of a succeeding carrier into the introducing means.

5. A camera for photographically recording in spaced relation the information encoded by perforations on individual carriers of a pluarlity thereof on a continuous film comprising two adjacent elongated light tight chambers open to each other at the forward end thereof and having a common longitudinal wall, a photographic objective at the rear region of one chamber, a film gate associated with the objective, photographic film in the gate, means comprising a slot formed by a pair of parallel plates for inserting a perforated individual carrier into the forward region of the chamber housing the photographic objective, each individual carrier having a standard coding field, an aperture through the plates forming the slot of at least the dimensions of the coding field of the carrier, a perforated coding plate in the common longitudinal wall, a lamp in the rear region of the other elongated chamber, circuit means for connecting a source of electrical potential to the lamp, sensing means also connected to the circuit means for determining when a perforated carrier is correctly positioned in the slot with relation to the perforated coding plate and only on such determination energizing the normally extinguished lamp to photograph in combination the perforations of the inserted carrier and the coding plate and then extinguishing the lamp, means for advancing the film an amount sufficient for one succeeding photograph immediately after such energization and extinction of the lamp, the film advancing means being likewise connected to the circuit means, and a system of mirrors of which the individual mirrors are disposed in both chambers so that on energization of the lamp a first light beam thereof reflected by a first mirror of the system in the lamp containing chamber passes through the perforations of the code plate and is reflected by a second mirror of the system in the objective-containing chamber into the objective while a second light beam from the energized lamp is reflected by a third mirror in the lamp chamber to a fourth mirror in the objective containing chamber and is reflected by the fourth mirror through the coding field perforations of the inserted carrier into the objective parallel and adjacent to and in non-interfering relation with the first beam photographically to record as dots the perforations of the coding field and of the code plate on the film in the gate.

6. A camera according to claim 5 in which the inserted carrier also has a plurality of positioning perforations at regions thereof lying outside the coding field, the sensing means including a plurality of lamps each with an associated photoelectric cell spaced therefrom to either side of the slot defining plates, the positioning perforations of each carrier being disposed to register with the plurality of lamps and their associated photoelectric cells sensing means on correct and complete insertion of the carrier, and a stop associated with the slot for determining when a carrier is completely inserted.

7. A camera according to claim 6 having an additional sensing means comprising a lamp and a photoelectric cell aligned therewith, the lamp and the cell being on opposite sides of the slot plates, the circuit means being connected to the lamps and to the cells of both sensing means, the additional sensing means being so positioned vertically in respect of the slot that when the carrier is correctly and completely in the slot the light path from the lamp to the cell of the additional sensing means is unimpeded while when the carrier is inserted improperly such path is blocked, an accept ejection and a reject ejection chute, the carrier ejection control means connected to the circuit means selectively to position the accept chute in registration with the slot when such light path is unimpeded and to position the reject chute in registration with the slot when such light path is blocked.

8. A camera according to claim 7 having an electric motor, a cam and an eccentric on the rotor shaft of the motor, a normally open microswitch in the circuit of the motor and operable to closure on a limited rotation of the rotor shaft, an actuating shaft reciprocably movable on rotation of the eccentric, the means for advancing film through the gate being coupled to the actuating shaft, an exposure counter actuated by the movement of the actuating shaft to its most forwardly position, a block movable with the actuating shaft in which at least some of the sensing means lamps are supported, an audible signal means, in which camera absent illuminations of any photoelectric cells the circuit means energizes the audible signal means while when all photoelectric cells are illuminated the circuit means deenergizes the audible signal means and transmits a pulse to the motor circuit to rotate the motor rotor shaft sufficiently to cause the cam to close the microswitch and maintain the same closed for substantially a single revolution of the motor rotor shaft, the revolving shaft moving the actuating shaft forwardly through the eccentric to move the block to accurately justify the position of the carrier at which time the circuit means connects the source of potential to the lamp in the rear of said other elongated chamber to energize such lamp sufficiently to take a photograph and thereupon the actuating shaft continues forwardly to advance by one the exposure counter and to bias the ejection control means so that on insertion of the next perforated carrier, the photographed carrier is ejected by the accept chute, whereupon the actuating shaft is moved rearwardly to actuate the film advancing means to feed the next frame of film into the gate and resume its preoperated position.

9. The camera according to claim 8 in which electrical control means interconnect the source of potential, the sensing means and the motor in such manner that the camera can be in one of three conditions, the first being when a carrier is properly fully inserted in the slot in which first condition the audible signal means is actuated during the carrier insertion and is stopped when the carrier is completely and correctly inserted, the ejection control means being biased to register the accept chute with the slot, whereupon the photographic cycle occurs, the second condition is that in which the audible signal means remains stopped with a carrier completely and correctly inserted and the photographic cycle has been completed for the particular carrier, and the third condition obtains where the audible signal means continues in operation on and after full but incorrect insertion of a carrier, a photographic cycle does not occur, and the ejection control means is biased to register the reject chute with the slot.

10. The camera according to claim 8 in which the ejection control means is positioned immediately below the lower end of the carrier insertion slot and comprises a rotatable shaft, a flap extending radially from the shaft and consisting of two flexible blades joined at their free end to form a V of which the other end of one blade is attached to the rotatable shaft and that of the other blade extends in covering relation over the rotatable shaft, a flat snap spring having one end anchored in the rotatable shaft and its other end in a fixed portion of the camera, the spring having a bowed position to the camera front when the free end of the flap is to the front of the exit of the carrier insertion slot and a bowed position concave to the front when the flap free end is to the rear of the exit of the carrier insertion slot, a first and a second radial arm integral with the rotatable shaft, a solenoid having a coil and a core movable axially itself within the coil on energization of the coil, the core on energization of the coil pressing against the first arm to rotate the rotatable shaft to position the free end of the flap behind the slot exit, the actuating shaft on its forward movement pushing the second arm to rotate the rotatable shaft to position the free end of the flap in front of the slot exit, and the reject and accept chutes having a common mouth, the rotatable shaft being mounted centrally of the chute mouth so that when the free V-end of the flap is behind the slot exit the carrier under ejection is guided by the flap into the reject chute while when such flap free V-end is in front of the slot exit the carrier is guided thereby into the accept chute.

11. The camera according to claim 8 in which the lamp in the rear region of said other elongated chamber is connected to a portion for flashing said lamp of the circuit means, which portion is of such configuration that the flashing voltage is independent of voltage variations in the source of electrical potential to which the circuit means including the flashing portion may be connected.

References Cited by the Examiner

UNITED STATES PATENTS

| | | | |
|---|---|---|---|
| 2,358,051 | 9/44 | Broido. | |
| 2,580,270 | 12/51 | Badgley et al. | 88—24 |
| 2,697,649 | 12/54 | Roth. | |
| 2,968,992 | 1/61 | Billet | 88—24 |
| 2,980,223 | 4/61 | Stidham | 88—24 X |
| 3,020,800 | 2/62 | Perry | 88—24 |
| 3,039,582 | 6/62 | Simjian. | |

NORTON ANSHER, *Primary Examiner.*
EMIL G. ANDERSON, *Examiner.*